United States Patent
Fujino et al.

(10) Patent No.: US 11,516,370 B2
(45) Date of Patent: Nov. 29, 2022

(54) IMAGE DISPLAY APPARATUS AND IMAGE DISPLAY METHOD

(71) Applicant: SEIKO EPSON CORPORATION, Tokyo (JP)

(72) Inventors: Makoto Fujino, Nagano (JP); Takumi Yamaguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 17/104,168

(22) Filed: Nov. 25, 2020

(65) Prior Publication Data

US 2021/0165622 A1 Jun. 3, 2021

(30) Foreign Application Priority Data

Nov. 29, 2019 (JP) ............................. JP2019-215948

(51) Int. Cl.
*G09G 5/10* (2006.01)
*G09G 5/02* (2006.01)
(Continued)

(52) U.S. Cl.
CPC ......... *H04N 1/6005* (2013.01); *G06F 3/1208* (2013.01); *G06F 3/1256* (2013.01); *G06F 3/1292* (2013.01); *H04N 1/0044* (2013.01); *H04N 1/6011* (2013.01); *H04N 1/6088* (2013.01); *G09G 3/2003* (2013.01);
(Continued)

(58) Field of Classification Search
CPC ........ G09G 5/10; G09G 5/02; G09G 2320/06; G09G 2320/0666; G09G 3/203; G06F 3/1208; G06F 3/1256; G06F 3/1292; H04N 1/6005; H04N 1/0044; H04N 1/6011; H04N 1/6088; H04N 1/62; H04N 1/4074; H04N 5/57; H04N 9/64; H04N 9/69; H04N 9/73; H04N 9/77; H04N 1/6075; H04N 1/6027; H04N 1/6083; H04N 1/6086

See application file for complete search history.

(56) References Cited

U.S. PATENT DOCUMENTS 9,459,820 B2 * 10/2016 Yoshida ................. G06F 3/1285
2006/0140477 A1 * 6/2006 Kurumisawa ............ H04N 1/62
382/167

(Continued)

FOREIGN PATENT DOCUMENTS

JP 2005-142769 A 6/2005

*Primary Examiner* — Wesner Sajous
(74) *Attorney, Agent, or Firm* — Global IP Counselors, LLP

(57) ABSTRACT

An image display apparatus displays an image to be printed on a desired printing medium by using a desired printing apparatus. In this process, medium images corresponding to the tint of the printing medium illuminated with one of illumination light fluxes having a plurality of color temperatures are displayed on a specific display with the medium images associated with the color temperatures of the illumination light fluxes, and specification of one of the medium images or the color temperature associated with the medium image is accepted. When the specification is made, an illumination light flux reflecting image having the tint of the image printed on the printing medium by the printing apparatus and illuminated with the illumination light flux having the color temperature corresponding to the specification is displayed on the specific display.

10 Claims, 8 Drawing Sheets

(51) Int. Cl.
*G09G 3/20* (2006.01)
*H04N 1/60* (2006.01)
*H04N 1/00* (2006.01)
*H04N 9/69* (2006.01)
*H04N 9/73* (2006.01)
*H04N 5/57* (2006.01)
*G06F 3/12* (2006.01)

(52) U.S. Cl.
CPC ....... *G09G 5/10* (2013.01); *G09G 2320/0666* (2013.01); *G09G 2340/06* (2013.01)

(56) References Cited

U.S. PATENT DOCUMENTS

| | | | | |
|---|---|---|---|---|
| 2008/0150908 A1* | 6/2008 | Someno | ................ | G06Q 10/10 345/173 |
| 2011/0142519 A1* | 6/2011 | Tsukuda | ................ | B41J 3/4075 400/76 |

\* cited by examiner

FIG. 5
| COLOR TEMPERATURE Dxx | PREVIEW DISPLAY |
|---|---|
| 6500K (D65) | 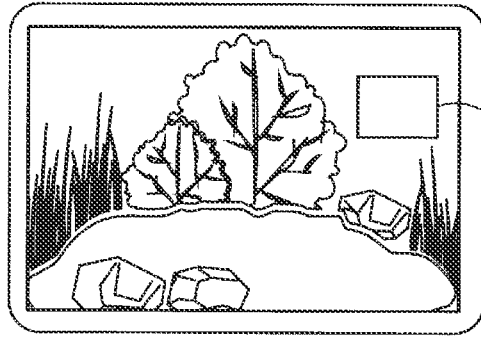 |
| 5000K (D50) | 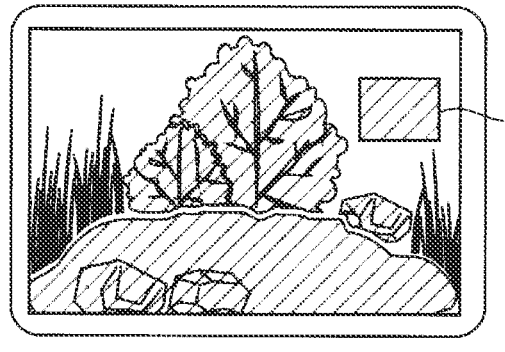 |
| 4000K (D40) | 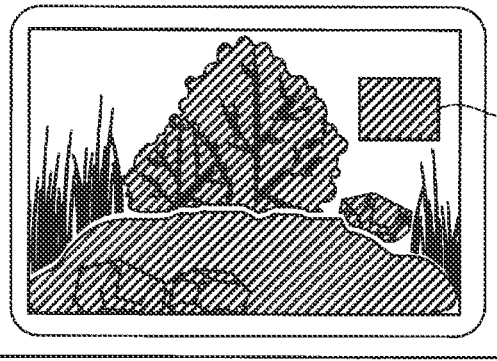 |
| 2800K (A LIGHT) | 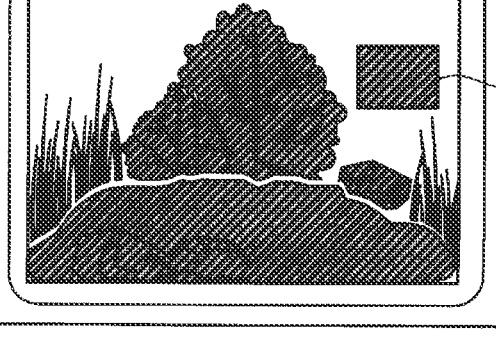 |

IMAGE DISPLAY APPARATUS AND IMAGE DISPLAY METHOD

The present application is based on, and claims priority from JP Application Serial Number 2019-215948, filed Nov. 29, 2019, the disclosure of which is hereby incorporated by reference herein in its entirety.

BACKGROUND

1. Technical Field

The present disclosure relates to an image display technology.

2. Related Art

There have been attempts on printed matter to make an image thereof displayed on a display be the same as the printed image as closely as possible. For example, JP-A-2005-142769 discloses an approach to measurement of the color temperature of illumination light in a user's observation of printed matter and adjustment of the aspect in accordance with which an image of the printed matter is displayed on the display, that is, the tint of the image in accordance with how the printed matter observed under the illumination light looks.

To measure the color temperature of the illumination light in observation of printed matter, however, there is a problem of the necessity of a dedicated measurement apparatus. Further, in recent years, wide use of terminals that excel in portability, such as a tablet terminal, leads to presentation of an image at a customer's site, determination or correction of the color arrangement and other factors or what is called color proofing, and printing of a brochure or any other material in response to the result of the color proofing. It is difficult to bring a dedicated instrument that measures the color temperature of the illumination light at the site where the color proofing is performed. From this point of view, an approach using a simple configuration to display of an image that reflects the color temperature of the illumination light on a display is desired.

SUMMARY

The present disclosure can be achieved in the form or application example below. An aspect of the present disclosure relates to an image display apparatus that displays an image to be printed on a desired printing medium by using a desired printing apparatus on a specific light emitting display. The image display apparatus includes a specification accepting section that displays medium images corresponding to a tint of the printing medium illuminated with one of illumination light fluxes having a plurality of color temperatures on the specific display with the medium images associated with the color temperatures of the illumination light fluxes and accepts specification of one of the medium images or the color temperature associated with the medium image and an image display control section that displays, when the specification is made, an illumination light flux reflecting image having the tint of the image printed on the printing medium by the printing apparatus and illuminated with the illumination light flux having the color temperature corresponding to the specification on the specific display.

BRIEF DESCRIPTION OF THE DRAWINGS

FIG. 5 is a descriptive diagram showing examples of the color temperature of observation light and a corresponding displayed image.

DESCRIPTION OF EXEMPLARY EMBODIMENTS

A. First Embodiment

Figure 1:
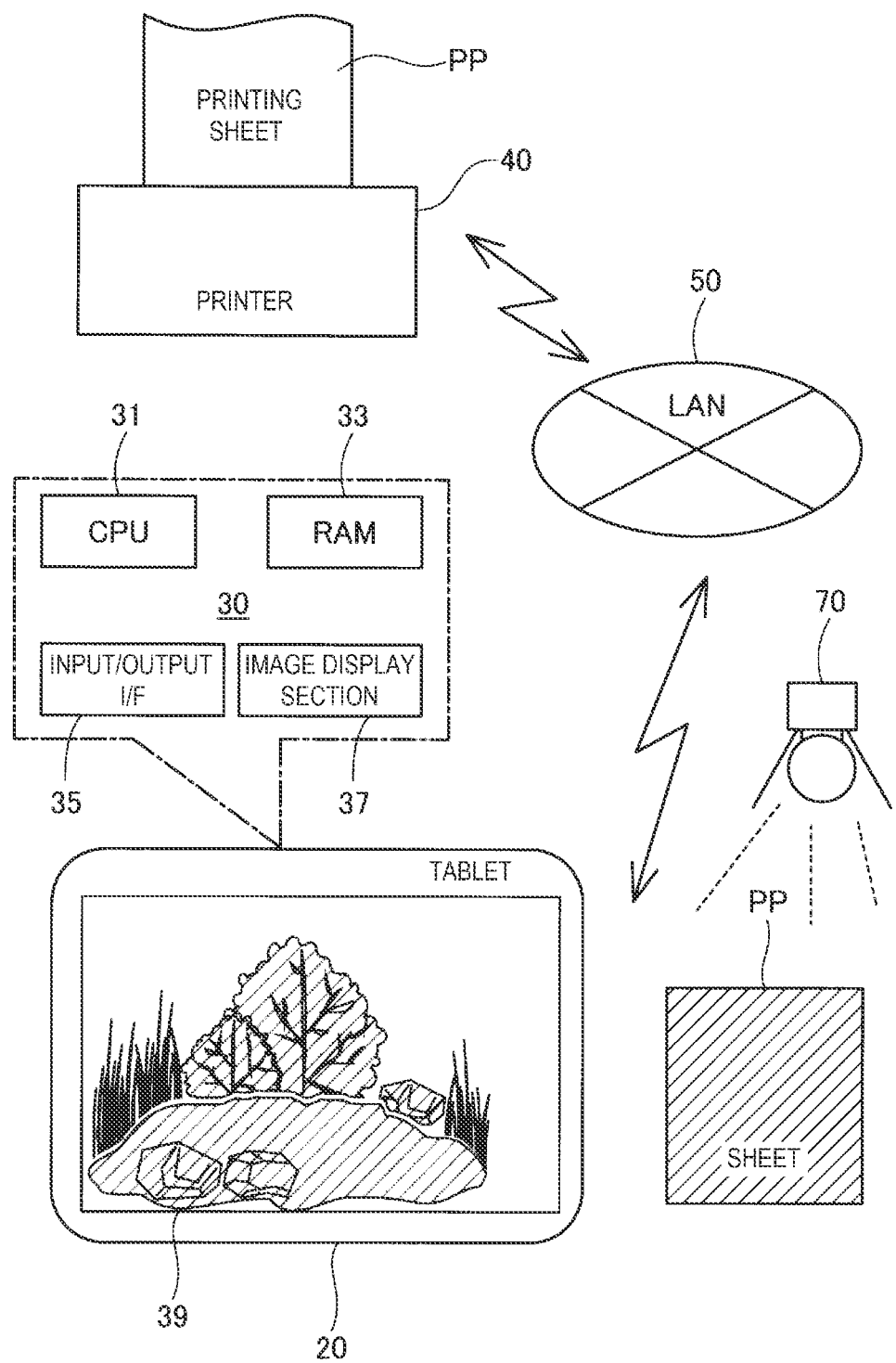
FIG. 1 is a system configuration diagram showing a printing system including an image display apparatus according to an embodiment.

A tablet terminal 20, which is an image display apparatus as a first embodiment, is coupled to a printer 40, which is a printing apparatus, via a network 50, as shown in FIG. 1. That is, the tablet terminal 20 can cause the printer 40 to print an image being edited. A printing sheet PP as a printing medium used in the printing can be any of a variety of types of sheets. The tablet terminal 20 can therefore cause a desired image to be printed on the sheet PP, for example, a plain sheet, a sheet exclusive for inkjet printer, and a photo-printing sheet (matte sheet/glossy sheet). It is assumed in the present embodiment that a white sheet is used as the sheet on which an image is printed.

The tablet terminal 20 includes an electronic controller 30, which includes, for example, a CPU 31, a RAM 33, an input/output interface (input/output I/F) 35, and an image display section 37, each of which is a known component, and a liquid crystal display 39, which displays an image under the control of the electronic controller 30. The liquid crystal display 39 is a light emitting display including a backlight and is capable of displaying a full-color image. The liquid crystal display 39 may be any light emitting display and can instead be a display using an organic EL device or a micro-LED.

An electrostatic touch panel is formed at the surface of the liquid crystal display 39. The tablet terminal 20 therefore externally acquires image data via the input/output I/F 35 by causing the CPU 31 to execute an application program developed in the RAM 33 or acquires an image directly drawn on the liquid crystal display 39 via the touch panel, carries out a printed image checking process based on a difference in observation light, and eventually transmits the image data to the printer 40 via the input/output I/F 35, and the printer 40 prints the image data. The tablet terminal 20 further includes a large-capacity battery, a power source switch, and other components built therein, but known configurations, such as those described above, are not illustrated or described.

An illuminator 70 is provided at the location where the tablet terminal 20 is used. The illuminator 70 illuminates a location in the vicinity thereof with light having a predetermined color temperature. Therefore, within the range of the illumination light from the illuminator 70, the tint of, for example, a white printing sheet PP changes in accordance with the color temperature of the illumination light from the illuminator 70. It can therefore be said that the illumination light under which the sheet PP is illuminated is observation light with which a sheet on which the printer 40 prints an image and the image on the sheet are observed. The tint is a shade of color, a color tone, or a hue and is particularly in the present specification used as a term that means how a color that forms the image and changes in accordance with the color temperature of the observation light looks.

Figure 2:
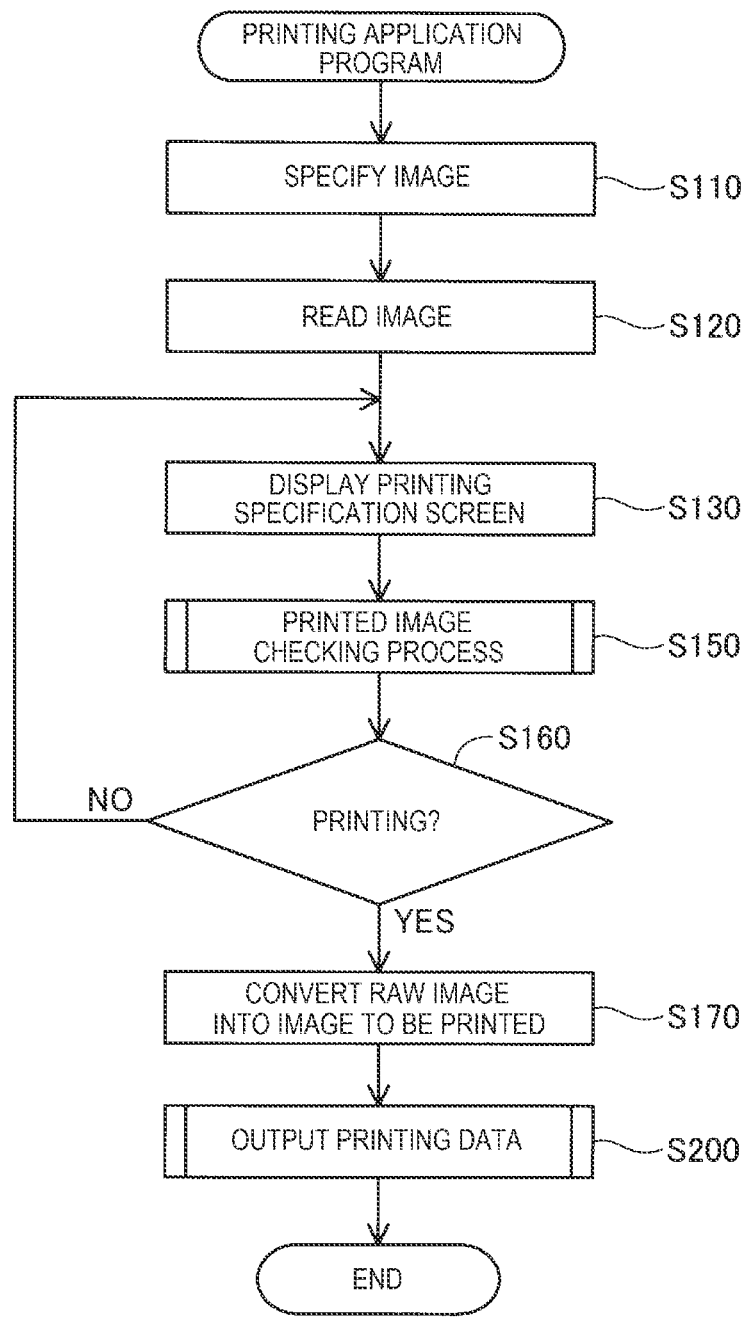
FIG. 2 is a flowchart showing processes of a printing application program.

The tablet terminal 20 performs a printing application program shown in FIG. 2. The application program reads data on an image having been created by another application program and prints the read image. The printing application program shown in FIG. 2 primarily aims to check the tint of the image, when it is printed, in advance on the screen of the tablet terminal 20. The printing application program therefore does not merely print an image but further has the function of checking the tint of the image when printed by a selected printer. An overview of the printing process and the printed image checking process will be described below with reference to FIGS. 2 and 3.

When the printing application program shown in FIG. 2 is activated in the tablet terminal 20, the electronic controller 30 of the tablet terminal 20 carries out the process of displaying a screen via which an image is specified on the liquid crystal display 39 (step S110). Thumbnails of images to be processed are displayed on the liquid crystal display 39 of the tablet terminal 20. When a user selects one of the thumbnails, the electronic controller 30 reads image data on the selected image (step S120). The image is expressed in an RGB color system. The image data itself is stored in the form of a file expressed, for example, in the JPEG format. The read image data is therefore decoded into 8-bit image data sets for RGB on a pixel basis, which is developed in the RAM 33.

Figure 4:
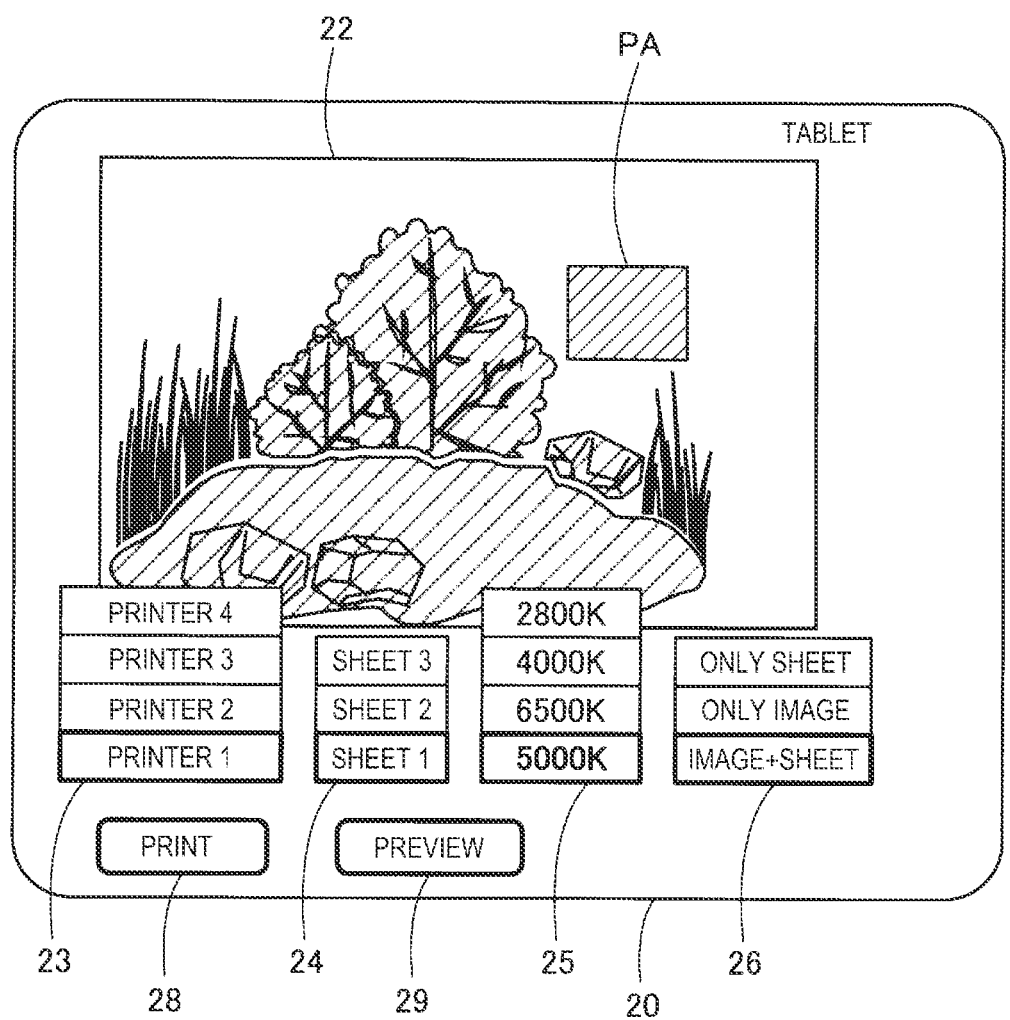
FIG. 4 is a descriptive diagram showing an example of a displayed screen in the printed image checking process.

The process of displaying a printing specification screen (step S130) is then carried out. FIG. 4 shows an example of the printing specification screen displayed in the process. In the printing specification screen, an image display area 22 is provided at the center of the liquid crystal display 39, a variety of setting popup buttons 23 to 26 are provided below the image display area 22, and a printing button 28 and a preview button 29 are further provided below the setting popup buttons 23 to 26. The variety of setting popup buttons 23 to 26, the printing button, and other buttons are each an object displayed on the liquid crystal display 39. When the user taps any of the objects, for example, with the user's finger, the touch panel provided at the surface of the liquid crystal display 39 detects the user's operation, and the operation is inputted as button operation.

The variety of setting popup buttons 23 to 26 are specifically formed of a printer specifying button 23, via which one of printers specifiable as a printing destination is specified, a sheet specifying button 24, via which the type of sheet on which an image is printed is specified, a color temperature specifying button 25, via which a color temperature close to the color temperature of the observation light is selected, and a preview setting button 26, via which the content of preview display is specified. When the user operates any of the buttons, a popup menu corresponding to the operated button is displayed. FIG. 4 is so drawn that the popup menus of all the buttons are shown. In practice, in the state in which the user has performed no operation on the liquid crystal display 39, only the areas each surrounded by a thick line are displayed as the buttons 23 to 26 on the liquid crystal display 39 of the tablet terminal 20. When the user taps any of the buttons, the popup menu of the tapped button is shown, and one of items prepared in advance in the popup menu is selectable.

For example, when the user taps the printer specifying button 23, printers 1 to 4 specifiable via the tablet terminal 20 are displayed as the popup menu. When the user taps one of the printers, the tapped printer is selected and displayed as a default of the printer specifying button 23 in the area of the specifying button 23. Similarly, when the user taps the sheet specifying button 24, a sheet 1, a sheet 2, and a sheet 3 are displayed as the popup menu and become specifiable. The types of the sheet include "a plain sheet," "a sheet exclusive for inkjet printer," and "a photo-printing sheet." The color temperature specifying button 25 is used to specify the color temperature of the observation light under which a printed image is observed, that is, the illumination at the location where the tablet terminal 20 is placed. The color temperature of the illumination light will be described later in detail.

The preview setting button 26 is used to specify whether the image to be displayed in the image display area 22 is only the image to be printed, an image of the sheet on which the image is printed, or both the image and the sheet. In FIG. 4, the preview setting button 26 is so operated that both the image and the sheet are displayed, and an image PA of the sheet is displayed in the image display area 22. In the present embodiment, the size of the image PA is about 4 cm square. The size was so determined as to correspond to the angular central visual field of human eyes (6 degrees) at an average distance (40 cm) at which the user uses the tablet terminal 20. The size may be greater in the first place as long as there is an enough display space. The size may instead be smaller when the distance at which the user uses the tablet terminal 20 is shorter. The preview button 29 allows the user to actually preview the image after the settings using the variety of setting popup buttons 23 to 26 described above are completed.

When the user taps the preview button 29, the electronic controller 30 detects the user's operation and carries out the printed image checking process (step S150). The printed image checking process is the process of displaying an image showing the result of a simulation on how the image printed with the specified printer on the specified sheet looks, primarily the tint of the image, and the simulation image is displayed across the liquid crystal display 39 of the tablet terminal 20. The process causes the liquid crystal display 39 to display not only the image to be printed but a simulation image showing the tint of the selected sheet at the specified color temperature. The process will be described later in detail. The user checks the images displayed on the liquid crystal display 39 and then operates the printing button 28 when the user proceeds to actual printing.

The electronic controller 30 evaluates instep S160 whether or not the printing button 28 has been operated. When the printing button 28 has not been tapped, the electronic controller 30 returns to step S130, where the electronic controller 30 repeats the processes described above via the displayed printing specification screen.

On the other hand, when the printing button 28 has been tapped, the electronic controller 30 detects the user's operation ("YES" in step S160), carries out the process of converting the image saved in the RAM 33 in the form of the image data on a pixel basis into an image to be specified printed (step S170), outputs the converted image data to the printer 40 via the network 50, and the printer 40 prints the image data (step S200). The printing application program is then terminated. An "End" button that terminates the printing application program may be displayed on the liquid crystal display 39, and the electronic controller 30 may return to step S110 after outputting the printing data (step S200) and repeat the processes described above.

The printed image checking process will be described with reference to the flowchart of FIG. 3. The printing specification screen (FIG. 4) has been displayed (step S130) before the printed image checking process (step S150), as having already been described with reference to FIG. 2. Therefore, in the printed image checking process (step S150), the user operates the variety of setting popup buttons 23 to 26 in the printing specification screen to repeat the process of selecting a printer and a printing medium (printing sheet) (step S151), the process of selecting a color temperature (step S152), and the process of selecting a display aspect (step S153) until the preview button 29 is pressed. When the preview button 29 is pressed, the electronic controller 30 determines a device link profile (step S155) and displays a preview screen on the liquid crystal display 39 (step S156).

The user of the tablet terminal 20 can thus check the tint of the printed white sheet PP at the specified color temperature on the liquid crystal display 39. In this process, the image display area 22 of the liquid crystal display 39 displays not only the image to be printed but the image PA of the sheet. The image displayed in the image display area 22 is displayed by using a tint perceived by the user who observes the image printed on the white printing sheet under the observation light having the specified color temperature. The image PA displayed in the image display area 22 and corresponding to the white sheet is also displayed by using the user perceived tint under the observation light having the color temperature at which the white sheet PP has been specified.

The user then looks at the screen shown in FIG. 4 and specifies a color temperature close to the color temperature of the actual observation light as the color temperature of the observation light while comparing the sheet PP on hand with the image PA of the sheet on the liquid crystal display 39. That is, the user actually compares the tint of the sheet PP illuminated with the observation light from the illuminator 70 with the tint of the image displayed on the liquid crystal display 39, which is a light emitting display, in particular, with the image PA of the sheet and specifies the color temperature of the illumination light on the liquid crystal display 39 in such a way that the two color temperatures coincides with or close to each other.

FIG. 5 is a descriptive view showing examples of the specification of the color temperature of the observation light and the image displayed in the image display area 22. In FIG. 5, the lower the color temperature of the observation light, the darker the image displayed in the image display area 22 of the liquid crystal display 39. In practice, however, the lower the color temperature, the more reddish the displayed image. Specifically, color temperatures selectable as the color temperature of the observation light in the present embodiment are the following four: "6500 K (called "D65" in color optics);" "5000 K (D50);" "4000 K (D40);" and "2800 K (A light)." The illuminator 70 used in the present embodiment is formed of a fluorescent lamp or an LED. Illumination light valves (including fluorescent lamps) sold in Japan output light having, for example, "daylight color," "neutral white," "white," and "light valve color." The color temperatures of the light described above are about 6500 K, 5000 K, 4200 K, and 2800 K, respectively. The color temperatures described above are therefore specifiable color temperatures in the description.

The color temperature associates the color of light to be expressed with the color of the light radiated from a black body having a certain temperature (high heat) and specifies the tint of the light to be expressed in the form of the temperature of the radiating black body. An ideal black body is assumed, and the distribution of the wavelength of the light radiated by the black body at a specific temperature is handled as the color. A low temperature corresponds to orange, a higher temperature corresponds to yellowish white, and a further higher temperature corresponds to bluish white. The color of white can thus be expressed in the form of the temperature of the black body, and the temperature is called a color temperature. The color temperature of the morning sunlight and evening sunlight is about 2000 K, and the color temperature of the ordinary sunlight ranges from 5000 K to 6000 K. The color temperature of the brightest sunlight through the fine-weather sky at a high altitude is about 6500 K. Therefore, even in the case of a white sheet having uniform reflectance irrespective of the wavelength, the hue of the light reflected off the sheet varies depending on the type of the illumination (difference in color temperature).

Since the image display area 22 also displays the image PA of a white sheet in addition to the image to be printed, as shown in FIG. 5, the user compares the tint of the image PA with the tint of the actual printing sheet PP on hand illuminated with the light from the illuminator 70 and specifies the color temperature that coincides with or is close to the color temperature of the actual printing sheet PP. In this process, the user previews the image of the printing sheet PP at the specified color temperature, as shown in FIG. 4. When the user then operates the printing button 28, the color temperature used in the operation described above is automatically specified in the printing operation. Instead, printed images at the color temperatures and the image PA of the sheet may be displayed in the form of a list on the liquid crystal display 39, as shown in FIG. 5, and the user may tap an image that the user determines based on the list to have the same tint as that of the printing sheet PP on hand to specify the color temperature.

The tablet terminal 20 is also illuminated with the illumination light as the observation light from the illuminator 70. However, since the liquid crystal display 39 provided as part of the tablet terminal 20 is a light emitting display, it can be considered that the tint of an image displayed on the liquid crystal display 39, although affected by the light from the illuminator 70, is not greatly affected by the observation light as compared with the sheet PP and a reflective display, which reflect the illumination light so that the tint of reflected light is determined, for example, a microcapsule-based electronic paper sheet. There is a tablet terminal 20 that detects the range of the wavelength of the light with which the tablet terminal 20 is illuminated and compensates the color of the emitted light to keep the tint of the apparent color within a fixed range. In the case of the tablet terminal 20 using a light emitting display, a change in the tint of the light from the liquid crystal display 39 due to a difference in the illumination light is not taken into account in the description.

Figure 3:
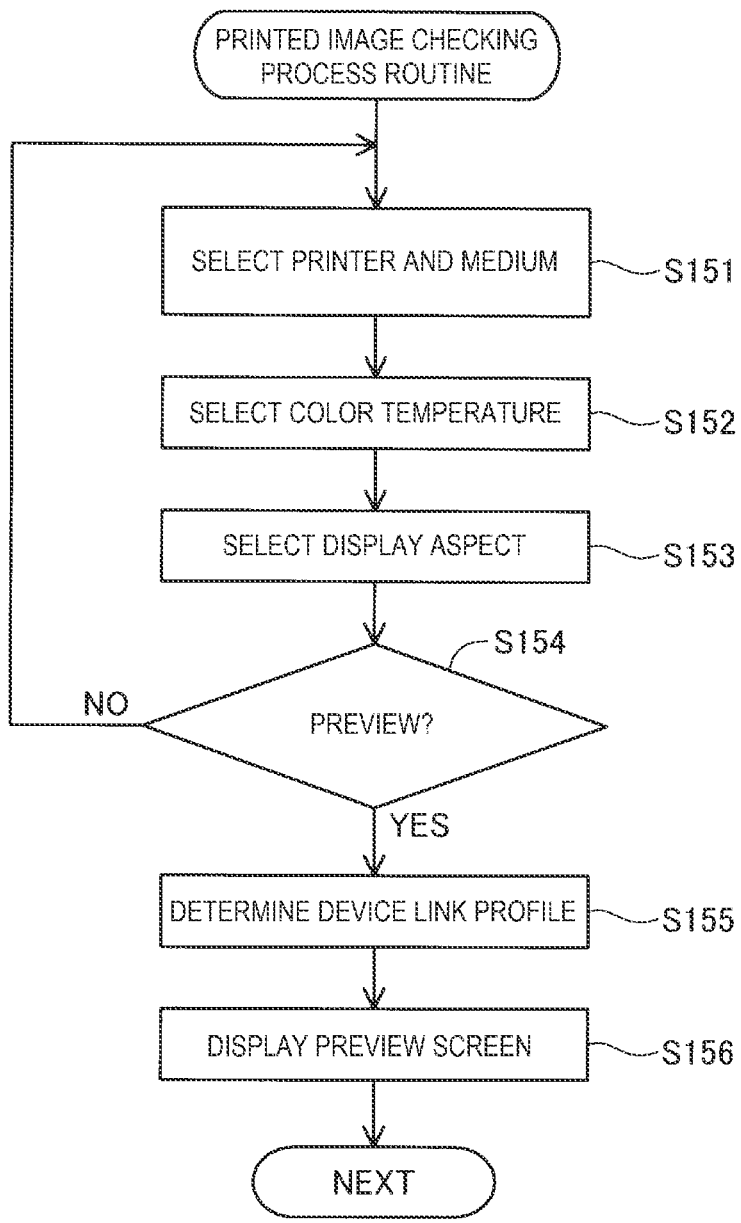
FIG. 3 is a flowchart showing a printed image checking process routine including an image display process.

In the printed image checking process routine shown in FIG. 3, when the user specifies the type of printer, the type of printing medium, and further the color temperature of the illumination light and operates the preview button 29 ("YES" in step S154), the device link profile is determined, and the preview screen is displayed (steps S155 and S156). The preview screen displayed in this process is an image that is the result of a simulation on the tint of an image printed by the specified printer on the specified printing medium, which is the white sheet PP, under the observation light. The approach of the simulation will be described.

Figure 6:
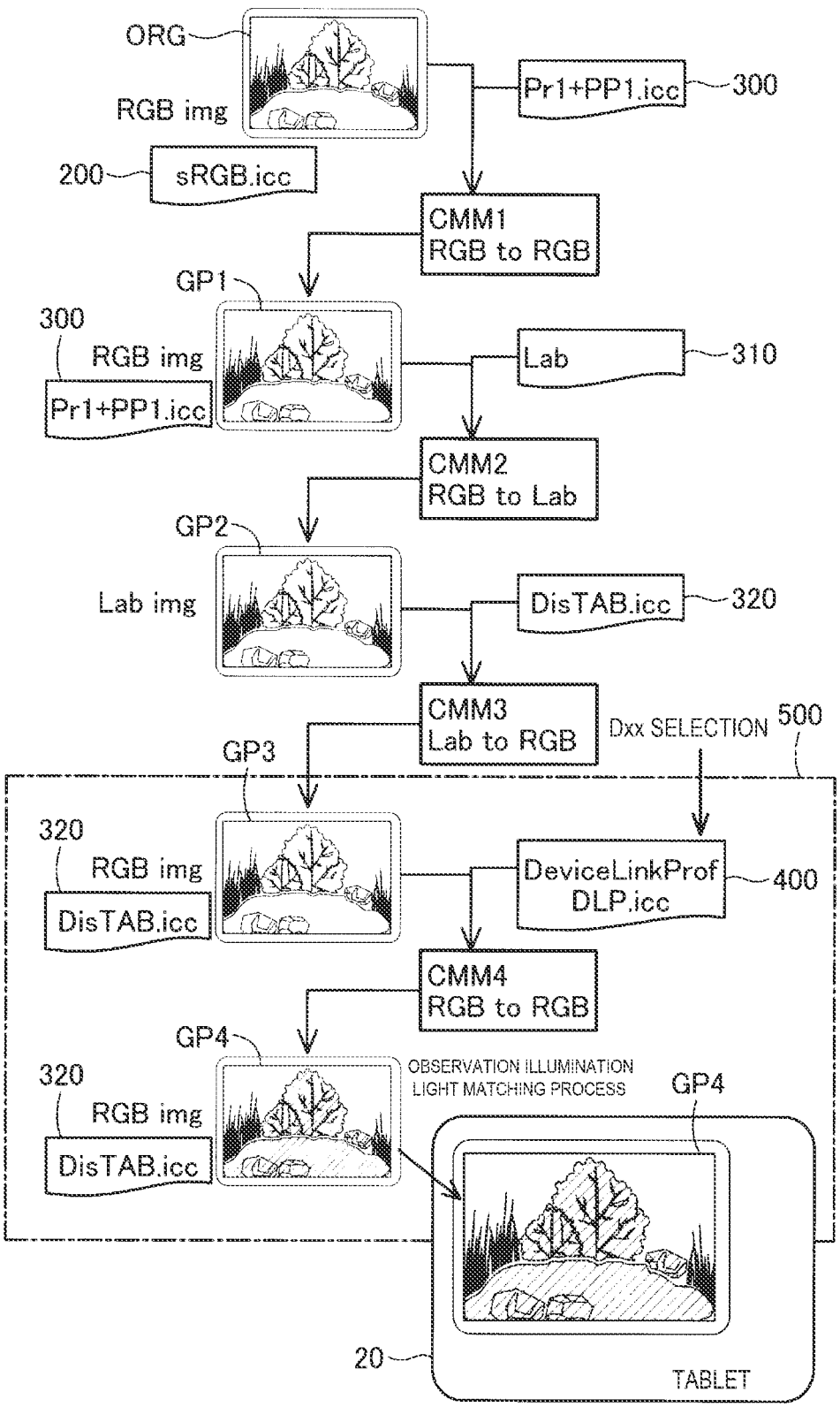
FIG. 6 is a descriptive diagram showing an overview of processes carried out to display an image on a tablet terminal in the printing application program.

FIG. 6 is a descriptive diagram showing the conversion of an original image ORG until the converted image is displayed on the liquid crystal display 39 of the tablet terminal 20. In FIG. 6, the blocks labeled with "CMM1" to "CMM4" represent color management modules that each perform color conversion (hereinafter also referred to as color management modules) and correspond to first to fourth converters. The color conversion is typically performed by matrix operation as long as the color before the conversion is theoretically the same as the color after the conversion. The color conversion that is not performed by a theoretical expression is performed by referring to a multi-dimensional (3D, for example) lookup table (LUT).

In FIG. 6, blocks labeled with reference characters 200, 300, 320, and 400 and containing files labeled with an extension ".icc" each mean an ICC profile. The ICC profile is a file that defines the characteristics of a color space on a device basis in accordance with the rules specified by International Color Consortium. Using the ICC profiles allows conversion between a device dependent color, such as RGB and CMYK used by a device and a data document, and a PCS (profile connection space) managed by a device independent color, such as CIE L*a*b* (hereinafter simply referred to as Lab in some cases) and CIE XYZ (hereinafter simply referred to as XYZ in some cases). The color space conversion is performed on a device basis by using the ICC profiles. The profile types specified by ICC are an input profile for converting the color space used by a scanner, a digital camera, and other apparatuses into PCS, a monitor profile used in the conversion between the monitor color space and PCS, an output profile for conversion between the color space used by a printer, a printing instrument, and other apparatuses and PCS, a color space profile used in distribution of an adobeRGB image, an sRGB image, and other images, and a device link profile that is formed of a plurality of device profiles combined into a single profile. In the specifications of the ICC profiles, the values of PCS described above are so specified as to be handled as values under the D50 condition. Further, desired image data conversion is achieved by assigning ICC profiles according to a purpose to a conversion source and a conversion destination.

The original image ORG is an image in the RGB format (RGB img) in the present embodiment, and a color space profile 200 of the original image ORG, which is defined in the sRGB color space, is defined as "sRGB.icc." On the other hand, a printer sheet profile 300, which is the output profile used in the output operation performed by a specified printer Pr1 and performed on a specified printing medium PP1, is defined and prepared as "Pr1+PP1.icc" in advance. An image GP1 is produced by specifying sRGB.icc described above as the source profile and Pr1+PP1.icc (BtoA1 table of Pr1+PP1.icc in more detail) as the destination profile in the color management module CMM1 and converting the color of the original image ORG. The profiles sRGB.icc and Pr1+PP1.icc (BtoA1 table of Pr1+PP1.icc in more detail) correspond to a first profile.

The image GP1 is an image expressed in the RGB space and reflects the tint that varies depending on the type of specified printer and the type of specified printing medium. The image GP1 is then converted by the color management module CMM2 into an image GP2 expressed in the Lab space. The image GP2 is therefore an image expressed by device independent colors (Lab img). In the conversion, since Pr1+PP1.icc (AtoB1 table of Pr1+PP1.icc in more detail) is the source profile, and no destination profile is present because the conversion destination is the Lab space, and the combination of the source profile and the destination profile corresponds to a second profile. In FIG. 6, the reference character 310 represents that the destination is the Lab space.

Thereafter, to display the image GP2 on the tablet terminal 20, the color of the image GP2 is converted by the color management module CMM3 based on the monitor profile 320 from the Lab space into the RGB space. The monitor profile 320 corresponds to a third profile. The monitor profile 320 for displaying the image on the liquid crystal display 39 of the tablet terminal 20 is defined and prepared as "DisTAB.icc" in advance. In the monitor profile 320, the color temperature of white light is typically set at a fixed value greater than or equal to 6500 K under the product practice, and the monitor profile 320 does not reflect information on unspecified color temperatures under the user environment. The image GP3, which is the result of the conversion performed by the color management module CMM3, therefore reflects the tint specified, for example, by the type of printer and the type of printing medium but reflects no change in the tint caused by the color temperature of the observation light. As a result, when the user observes the image on the tablet and the printing medium on which the same image is printed with the image and the printing medium juxtaposed side by side, the user perceives that the tint of the image and the tint of the printing medium differ from each other.

In view of the fact described above, the tablet terminal 20 in the present embodiment carries out an observation illumination light matching process 500 shown in FIG. 6 to display an image having a tint affected by the color temperature of the observation light. In the observation illumination light matching process 500, a device link profile 400 is determined in response to selection of a color temperature Dxx, and the color management module CMM4 uses the device link profile 400 to convert the image GP3 into an image GP4 having the tint based on the color temperature of the observation light in the same RGB space. The converted image GP4 is displayed on the liquid crystal display 39 of the tablet terminal 20. The device link profile 400 corresponds to a fourth profile. The actual device link profile 400 is created by a plurality of conversion actions, as will be described below.

The device link profile 400 used in the observation illumination light matching process 500 has a file name "DLP.icc" in FIG. 6, which represents a plurality of device profiles used in the conversion in the form of a single profile for convenience. The device link profile DLP.icc is created in accordance with the procedure shown in FIG. 7. Device link profiles 400 may be created in advance in accordance with differences in the color temperature, and any of the device link profiles 400 created in advance may be selected when the color temperature is specified. In the present embodiment, in which four color temperatures are specifiable, four device link profiles 400 may be determined in advance. The device link profile 400 may in the first place be computed and determined whenever necessary.

Figure 7:
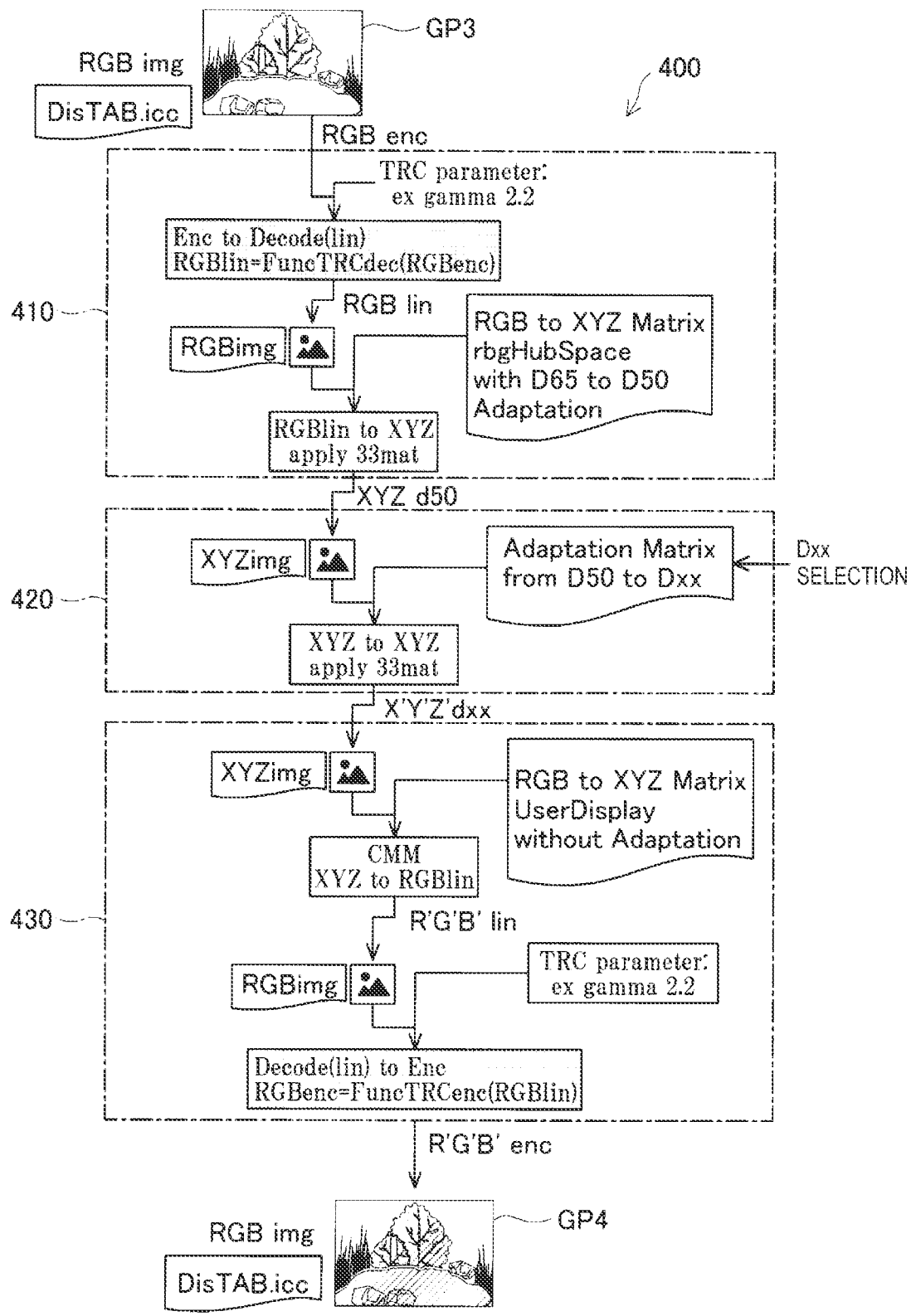
FIG. 7 is a descriptive diagram showing an overview of the process of determining a device link profile.
Figure 8:
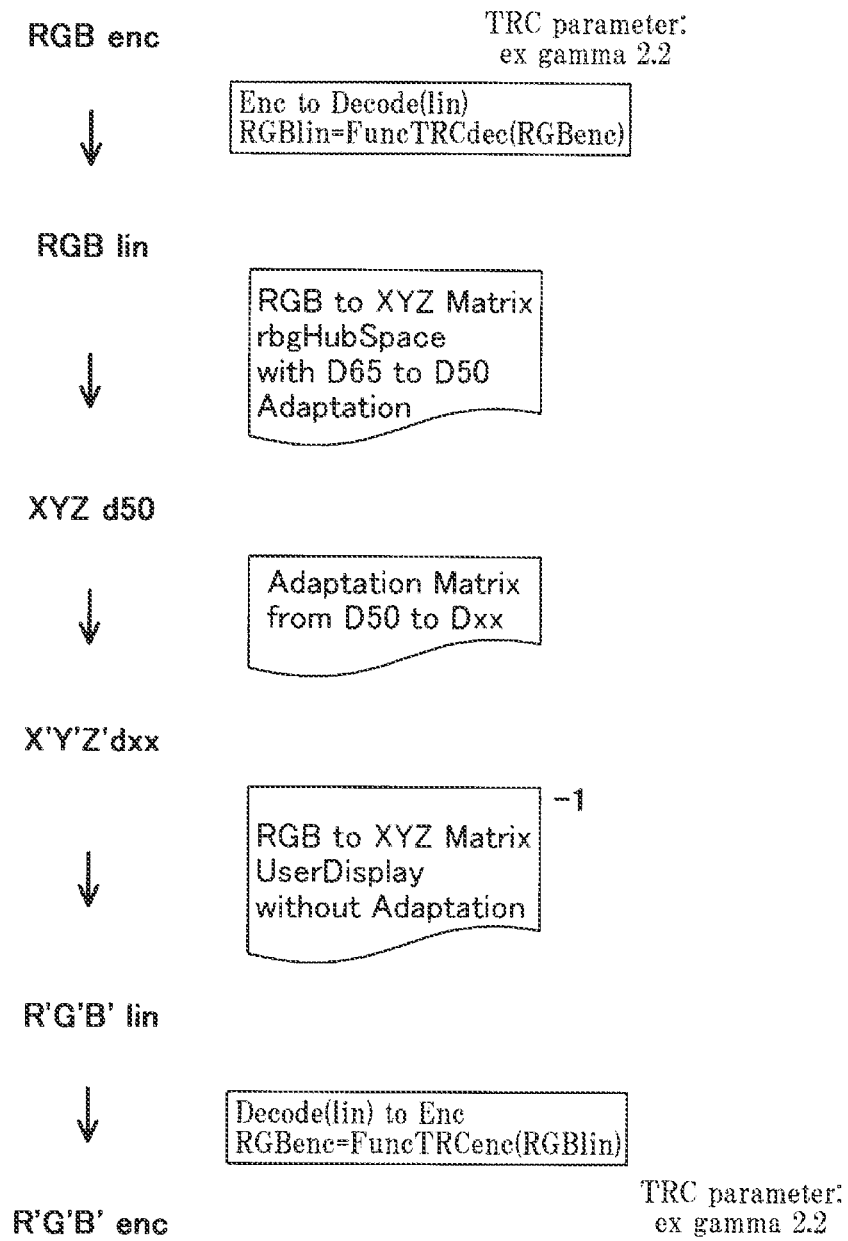
FIG. 8 is a descriptive diagram showing examples of the format of converted images.

The device link profile 400 is divided into three portions, as shown in FIG. 7. That is, the device link profile 400 corresponds to the combination of three computation sections: a first computation section 410, which converts the image GP3 in the RGB space into an image in an rgbHub space used by the tablet terminal 20; a second computation section 420, which performs conversion that simulates a change in the tint caused by the observation illumination light; and a third computation section 430, which performs conversion that is the inverse of the conversion performed by the first computation section. FIG. 8 shows the formats of the images produced by the conversion actions. The conversion actions using the device link profile 400 will be described below with reference to FIGS. 7 and 8.

The first computation section 410 includes a front stage where 1DLUT conversion using a tone reproduction curve (TRC) is performed on the image GP3 on a color basis and a rear stage where conversion from the RGB color space into the XYZ color space is performed by using a 3×3 matrix. The TRC parameter in the front stage is, for example, γ2.2 conversion, and the tone is increased or decreased in part of the tone region by referring to the 1DLUT corresponding to the y curve on an RGB color basis. The front-stage conversion converts RGB-integrated image data RGBenc, which forms the image GP3, into image data RGBlin, which has been corrected by 1DLUT.

The conversion in the rear stage of the first computation section 410 is basically the conversion from the RGB color space into the XYZ color space. The conversion is inter-color-space theoretical conversion and is determined by applying a known 3×3 matrix. It is, however, noted that conversion including color adaptation from the color temperature D65 to the color temperature D50 is also performed. As a result, the image data RGBlin is converted into image data XYZd50 at the color temperature D50. The color temperature may be intrinsically reflected by applying a color adaptation matrix for conversion from the color temperature D65 to the color temperature Dxx (any of D65, D50, D40, and A light) specified by the user. In the ICC profile specifications, however, a color adaptation matrix for conversion from D65 to D50 is specified, and the first computation section 410 therefore performs computation including color adaptation associated with the color temperature conversion from D65 into D50. The conversion into the actual color temperature is achieved by the second computation section 420, which reconverts the color temperature D50 employed in the first computation section 410 into the actual color temperature, which will be described later.

The second computation section 420 performs conversion using a color adaptation matrix from the color temperature D50 into the color temperature Dxx specified by the user in the XYZ color space, as described above. Since the 3×3 matrix, which converts the color temperature D50 into the color temperature D65, D50, D40, or A light, is a known matrix, it is easy to apply the 3×3 matrix. As a result, the image data is converted into image data X'Y'Z'dxx expressed in the XYZ color space and including the color adaptation to the color temperature specified by the user.

The third computation section 430 then performs conversion using a conversion matrix used in the first computation section 410 and using an inverse matrix of a matrix including no color adaptation. The conversion corresponds to reconversion of the image data that reflects the color adaptation to the color temperature Dxx, which is the color temperature of the observation illumination light and is specified by the user, and is the image data X'Y'Z' dxx expressed in the XYZ color space back into image data expressed on the liquid crystal display 39 of the tablet terminal 20 being used by the user. However, image data R'G'B'lin determined by applying the inverse matrix contains no color adaptation portion and is therefore not equal to the original image data RGBlin but differs therefrom by the degree corresponding to the color temperature of the observation illumination light. The same correction as the TRC-based y correction performed by the fist computation section 410 is then performed by using 1DLUT. The characteristic of 1DLUT is, however, the inverse of the characteristic of 1DLUT used by the first computation section 410, and the image data R'G'B'lin is converted into integrated image data R'G'B'enc in the integrated RGB format. The image data R'G'B'enc corresponds to image data GP4 displayed on the liquid crystal display 39 of the tablet terminal 20.

As described above, the tablet terminal 20 in the present embodiment simulates before image printing how the image to be printed on the printing sheet PP looks depending on the color sensitivity of the observation illumination light and allows the user to check the result of the simulation. Further, to this end, a measurement apparatus for measuring the color temperature of the observation illumination light or any other apparatus is not required. The user only needs to compare the tint felt by the user when the white sheet PP is irradiated with the actual observation illumination light, that is, the light from the illuminator 70 with the tint of the image PA corresponding to the sheet and displayed on the liquid crystal display 39 of the tablet terminal 20 and specify a color temperature closet to that of the actual observation illumination light, whereby the user can check with a simple procedure how the image to be printed looks in consideration of the difference in the color temperature of the observation illumination light before the image is printed.

Further, in the present embodiment, a white sheet is used to specify the color temperature, and a white sheet causes a large difference in tristimulus values felt by human eyes depending on a difference in the color temperature of the observation illumination light. Using a white sheet therefore allows easy specification of the color temperature. Further, in the present embodiment, the image display area 22 provided on the liquid crystal display 39 of the tablet terminal 20 displays the sheet image PA having the size of about 4×4 cm, which covers the central visual field of human eyes who uses the tablet terminal 20, whereby the user can readily check the tint of the image PA when comparing the tint of the image PA with the tint of the sheet PP actually irradiated with the light from the illuminator 70.

B. Other Embodiments (1) The present disclosure can be implemented in the form of other aspects. For example, a first aspect can be assumed to be an image display apparatus that displays an image to be printed on a desired printing medium by using a desired printing apparatus on a specific light emitting display. The image display apparatus can be configured to include the following sections: a specification accepting section that displays medium images corresponding to the tint of the printing medium illuminated with one of illumination light fluxes having a plurality of color temperatures on the specific display with the medium images associated with the color temperatures of the illumination light fluxes and accepts specification of one of the medium images; and an image display control section that displays, when specification of one of the medium images or the color temperature associated with the medium image is accepted, an illumination light flux reflecting image having the tint of the image printed on the printing medium by the printing apparatus and illuminated with the illumination light flux having the color temperature corresponding to the specification on the specific display.

The image display apparatus allows in-advance checking of how the printed image is visually recognized depending on the color temperature of the illumination light. Further, to this end, an apparatus that measures the color temperature of the illumination light used to observe the image is not required. The light emitting display can, for example, be a liquid crystal display including a backlight or a display using an organic EL device or a micro-LED device, which are each a self-luminous light emitting device.

In the aspect, a difference in the illumination light may be specified by specifying one of medium images illuminated with illumination light fluxes having a plurality of color temperatures or by directly specifying the color temperature associated with the medium image. The specification may be performed by sequentially switching the display at a color temperature to another and looking at the displayed medium image or displaying the medium images at the plurality of color temperatures together and specifying one of the medium images.

(2) In the thus configured image display apparatus, the image display control section may include a first conversion section that converts image data representing an image expressed in a specific color system, in response to the specification of the type of the medium on which the image is printed and the type of the printing apparatus that prints the image on the medium, into first image data corresponding to the state in which the image data is printed on the printing medium by the printing apparatus in accordance with a first profile prepared in correspondence with the type of the media and the type of the printing apparatus, a second conversion section that converts the first image data into second image data that expresses the image in a standard color system in accordance with a second profile for converging the specific color system into the standard color system, a third conversion section that converts the second image data into third image data in accordance with a third profile for displaying the image on the specific display, and a fourth conversion section that converts the third image data into fourth image data corresponding to the illumination light flux reflecting image in response to the specification of one of the medium images and in accordance with a fourth profile determined in accordance with the color temperature of the illumination light flux corresponding to the specified medium image, and the image may be displayed on the specific display based on the converted fourth image data. An image display apparatus of related art including the first to third conversion sections can therefore be changed to an apparatus that allows checking of the tint of a printed image according to the color temperature of the illumination light only by providing the image display apparatus with the fourth conversion section.

(3) In the thus configured image display apparatus, the printing medium may be a white sheet. A white sheet causes a large difference in tristimulus values felt by human eyes depending on a difference in the color temperature of the illumination light used in the observation. Using a white sheet therefore allows easy specification of the color temperature. The printing medium may instead be a color sheet other than a white sheet. In this case, the sheet other than a white sheet may be read in advance, and the TRC parameter in the first computation section 410 of the device link profile 400 may, for example, be corrected in accordance with the tint of the sheet.

(4) The medium image described above may have an area having a diameter at least greater than or equal to 4 cm. The medium image, which is compared with the actual sheet, desirably has a size greater than or equal to a certain size. Human eyes excluding the central visual field thereof less involve visual recognition than the central visual field. The medium image therefore only needs to cover at least the central visual field. The relationship between the size of the image and the central visual field changes with the distance to the image display apparatus. Therefore, for example, assuming that the distance from the specific display to the image display apparatus is about 40 cm, the size of the image that falls within the central viewing field is about 4 cm when the angular central visual field is six degrees. The medium image may have a circular or elliptical shape having the diameter of 4 cm or may have a rectangular, oblong, or polygonal shape having 4-cm short edges.

(5) In the thus configured image display apparatus, the specification accepting section may alternately and selectively display a plurality of medium images corresponding to the colors of the printing medium illuminated with the illumination light fluxes having the plurality of color temperatures on the specific display. The color temperature can thus be readily specified. The specification may in the first place be performed by sequentially switching the display at a color temperature to another and looking at the displayed medium image. Displayed contents illuminated with illumination light fluxes having different color temperatures do not therefore enter together the visual field. Therefore, when the tint of each of the medium images is compared with the tint of the actual printing medium, the user is not caught by the other images having tints that change depending on the illumination light fluxes having different color temperatures.

(6) The plurality of color temperatures may include at least two of 6500 K, 5000 K, 4000 K, and 2800 K, and the fourth profile corresponding to each of the color temperatures may be stored in advance. The color temperatures are each a color temperature of the light from a normally available illuminator, whereby how an object illuminated with actual illumination light looks and the tint of the object can be readily simulated. Assuming that the number of color temperatures is limited, the corresponding fourth profiles can be stored in advance, whereby the tint of an image at each of the color temperatures at the time of printing can be reproduced. The fourth profile may be computed whenever necessary in the first place.

(7) The image display apparatus described above may be a tablet terminal, and the specific display may be a backlight-equipped, liquid crystal or organic EL display incorporated in the tablet terminal in advance. The image display apparatus can therefore be readily carried, and an image to be printed can be edited and determined at any location, for example, at a meeting site. In this case, the meeting does not always take place at a location where the color temperature of the illumination light is managed, such as a dedicated studio. The user therefore looks at a printing medium on which an image is printed under any of a variety of types of illumination light. The image display apparatus described above can avoid a situation in which an image on the image display apparatus and an actually printed image look differently due to a difference in the color temperature of the illumination light.

(8) The tablet terminal described above may have a correction function of correcting the tint of the image displayed on the specific display in accordance with the color temperature of environment light incident on the tablet terminal, and the fourth profile may be so specified that the conversion is performed in consideration of the amount of tint correction made by the correction function. For example, iPad (registered trademark of Apple Inc.) has a function named TRUE TONE (registered trademark of Apple Inc.) incorporated therein, detects the color temperature of the illumination around the tablet, and makes correction in such a way that the difference between white (color temperature) on the display and the color temperature of the illumination light decreases. In this case, the fourth profile may be so corrected in advance that the tint is compensated in consideration of the amount of correction.

(9) The thus configured image display apparatus may include a printing control section that converts the image to be printed into printing data and outputs the printing data to the printing apparatus. The image display apparatus thus allows printing of the image.

(10) A second aspect of the present disclosure can be conceived as an image display method for displaying an image to be printed on a desired printing medium by using a desired printing apparatus on a specific light emitting display. The image display method includes the following steps: displaying medium images corresponding to the tint of the printing medium illuminated with one of illumination light fluxes having a plurality of color temperatures on the specific display with the medium images associated with the color temperatures of the illumination light fluxes and accepting specification of one of the medium images; and displaying, when specification of one of the medium images is accepted, an illumination light flux reflecting image having the tint of the image printed on the printing medium by the printing apparatus and illuminated with the illumination light flux having the color temperature corresponding to the specified medium image on the specific display. The same effects and advantages as those provided by the first aspect can thus be provided.

(11) In the embodiments described above, part of the configuration achieved by hardware may be replaced with software. At least part of the configuration achieved by software may be achieved by a discrete circuit configuration. When part or entirety of the functions in the present disclosure is achieved by software, the software (computer program) can be provided in the form of a computer readable recording medium that stores the software. The "computer readable recording medium" is not limited to a portable recording medium, such as a flexible disk and a CD-ROM, and includes an internal storage device in a computer, such as a variety of RAMs and ROMs, and an external storage device fixed to the computer, such as a hard disk drive. That is, the "computer readable recording medium" has a wide meaning including an arbitrary recording medium capable of permanently storing a data packet instead of temporal storage.

The present disclosure is not limited to the embodiments described above and can be achieved in a variety of configurations to the extent that they do not depart from the substance of the present disclosure. For example, the technical features described in the embodiments and corresponding to the technical features in the aspects described in the paragraph of Summary can be replaced with other features or combined with each other as appropriate to solve part or entirety of the problems described above or achieve part or entirety of the effects described above. Further, when any of the technical features have not been described as essential features in the present specification, the technical feature can be deleted as appropriate.

What is claimed is:

1. An image display apparatus that displays an image to be printed on a desired printing medium by using a desired printing apparatus on a specific light emitting display, the image display apparatus comprising:
    a specification accepting section that displays, on the specific display, at least one of medium images which are images of the printing medium on which the image is to be printed, each of which corresponds to a tint of the printing medium illuminated with one of illumination light fluxes having a plurality of color temperatures, and which are associated with the color temperatures of the illumination light fluxes, the specification accepting section further accepting specification of one of the medium images or one of the color temperatures; and
    an image display control section that displays, when the specification is accepted, an illumination light flux reflecting image having the tint of the image to be printed on the printing medium by the printing apparatus and illuminated with the illumination light flux having the color temperature corresponding to the specification on the specific display.

2. The image display apparatus according to claim 1, wherein the image display control section includes
    a first conversion section that converts image data representing an image expressed in a specific color system, in response to specification of a type of a medium on which the image is printed and a type of a printing apparatus that prints the image on the medium, into first image data corresponding to a state in which the image data is printed on the printing medium by the printing apparatus in accordance with a first profile prepared in correspondence with the type of media and the type of printing apparatus,
    a second conversion section that converts the first image data into second image data that expresses the image in a standard color system in accordance with a second profile for converging the specific color system into the standard color system,
    a third conversion section that converts the second image data into third image data in accordance with a third profile for displaying the image on the specific display, and
    a fourth conversion section that converts the third image data into fourth image data corresponding to the illumination light flux reflecting image, in response to the specification of one of the medium images and in accordance with a fourth profile determined in accordance with the color temperature of the illumination light flux corresponding to the specified medium image, and
    the image is displayed on the specific display based on the converted fourth image data.

3. The image display apparatus according to claim 1, wherein the printing medium is a white sheet.

4. The image display apparatus according to claim 1, wherein the medium images each have an area having a diameter at least greater than or equal to 4 cm.

5. The image display apparatus according to claim 1, wherein the specification accepting section alternately and selectively displays a plurality of medium images corresponding to colors of the printing medium illuminated with the illumination light fluxes having the plurality of color temperatures on the specific display.

6. The image display apparatus according to claim 2, wherein the plurality of color temperatures include at least two of 6500 K, 5000 K, 4000 K, and 2800 K, and the fourth profile corresponding to each of the color temperatures is stored in advance.

7. The image display apparatus according to claim 1, wherein the image display apparatus is a tablet terminal, and the specific display is a backlight-equipped, liquid crystal or organic EL display incorporated in the tablet terminal in advance.

8. The image display apparatus according to claim 2,
wherein the image display apparatus is a tablet terminal, and the specific display is a backlight-equipped, liquid crystal or organic EL display incorporated in the tablet terminal in advance, and the tablet terminal has a correction function of correcting the tint of the image displayed on the specific display in accordance with the color temperature of environment light incident on the tablet terminal, and the fourth profile is so specified that the conversion is performed in consideration of an amount of tint correction made by the correction function.

9. The image display apparatus according to claim 1, further comprising a printing control section that converts the image to be printed into printing data and outputs the printing data to the printing apparatus.

10. An image display method for displaying an image to be printed on a desired printing medium by using a desired printing apparatus on a specific light emitting display, the image display method comprising:

displaying, on the specific display, at least one of medium images which are images of the printing medium on which the image is to be printed, each of which corresponds to a tint of the printing medium illuminated with one of illumination light fluxes having a plurality of color temperatures, and which are associated with the color temperatures of the illumination light fluxes, and accepting specification of one of the medium images or one of the color temperatures; and displaying, when the specification is accepted, an illumination light flux reflecting image having the tint of the image to be printed on the printing medium by the printing apparatus and illuminated with the illumination light flux having the color temperature corresponding to the specification on the specific display.

* * * * *